US009796490B2

(12) United States Patent
Jiang et al.

(10) Patent No.: US 9,796,490 B2
(45) Date of Patent: Oct. 24, 2017

(54) AQUEOUS SOLUTION AND METHOD FOR USE THEREOF

(71) Applicant: Schlumberger Technology Corporation, Sugar Land, TX (US)

(72) Inventors: Li Jiang, Katy, TX (US); Bruno Lecerf, Houston, TX (US); Murtaza Ziauddin, Katy, TX (US); Richard D. Hutchins, Sugar Land, TX (US); Timothy G. J. Jones, Cambridge (GB); Jian He, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 657 days.

(21) Appl. No.: 14/062,291

(22) Filed: Oct. 24, 2013

(65) Prior Publication Data

US 2015/0114647 A1 Apr. 30, 2015

(51) Int. Cl.
| | |
|---|---|
| *E21B 43/22* | (2006.01) |
| *E21B 43/26* | (2006.01) |
| *B65B 3/04* | (2006.01) |
| *C09K 8/74* | (2006.01) |

(52) U.S. Cl.
CPC ............ *B65B 3/04* (2013.01); *C09K 8/74* (2013.01); *E21B 43/26* (2013.01)

(58) Field of Classification Search
CPC  C09K 8/74; C09K 8/528; E21B 43/26; E21B 43/16; E21B 43/267; E21B 43/25; E21B 43/261; E21B 43/28
See application file for complete search history.

(56) References Cited

U.S. PATENT DOCUMENTS

| | | |
|---|---|---|
| 556,669 A | 3/1896 | Frasch |
| 2,185,864 A | 1/1940 | Muskat et al. |
| 2,250,379 A | 7/1941 | Johnson |
| 2,250,474 A | 7/1941 | Eisenbrand et al. |

(Continued)

FOREIGN PATENT DOCUMENTS

| | | |
|---|---|---|
| CN | 102828734 A | 12/2012 |
| CN | 103333673 A | 10/2013 |

(Continued)

OTHER PUBLICATIONS

Liu, et al., "Acid Fracturing Technique for Carbonate Reservoirs Using Nitric Acid Powder," presented at the Petroleum Society's Canadian International Petroleum Conference 2003, Calgary, Alberta, Canada Jun. 10-12, 2003, published as Paper 2003-007 by Petroleum Society, Canadian Institute of Mining, Metallurgy & Petroleum, 11 pages.

(Continued)

*Primary Examiner* — Zakiya W Bates
(74) *Attorney, Agent, or Firm* — Andrea E. Tran

(57) ABSTRACT

Aqueous compositions contain hydrochloric acid at a concentration between 8 wt % and 28 wt % inclusive. The amino acid; hydrochloric acid mole ratio may be between 0.2 and 1.5. Sufficient water is present to dissolve the hydrochloric acid and the amino acid. Such compositions have utility as retarders for acid compositions employed in the stimulation of subterranean formations. Slowing the reaction between the acid and formation helps maximize formation permeability and productivity.

13 Claims, 1 Drawing Sheet

(56) References Cited

U.S. PATENT DOCUMENTS

| | | |
|---|---|---|
| 2,485,529 A | 10/1949 | Cardwell |
| 2,860,106 A | 11/1958 | Little et al. |
| 3,826,312 A | 7/1974 | Richardson et al. |
| 3,892,275 A | 7/1975 | Lybarger et al. |
| 3,920,566 A | 11/1975 | Richardson et al. |
| 3,920,591 A | 11/1975 | Jacobs et al. |
| 3,936,316 A | 2/1976 | Gulla |
| 3,953,340 A | 4/1976 | Templeton et al. |
| 3,953,352 A | 4/1976 | Mizutani et al. |
| 3,963,650 A | 6/1976 | Ogden |
| 4,094,957 A | 6/1978 | Sartori et al. |
| 4,116,664 A | 9/1978 | Jones |
| 4,151,098 A | 4/1979 | Dill et al. |
| 4,315,763 A | 2/1982 | Stoller et al. |
| 4,420,414 A | 12/1983 | Valone |
| 4,428,432 A | 1/1984 | Pabley |
| 4,466,893 A | 8/1984 | Dill |
| 4,487,265 A | 12/1984 | Watanabe |
| 4,567,946 A | 2/1986 | Watanabe |
| 4,648,456 A | 3/1987 | Lamb et al. |
| 4,673,522 A | 6/1987 | Young |
| 4,675,120 A | 6/1987 | Martucci |
| 4,753,746 A | 6/1988 | Mesmer et al. |
| 4,807,703 A | 2/1989 | Jennings, Jr. |
| 4,830,766 A | 5/1989 | Gallup et al. |
| 5,120,471 A | 6/1992 | Jasinski et al. |
| 5,616,151 A | 4/1997 | Sargent et al. |
| 5,650,633 A | 7/1997 | Ahmed et al. |
| 5,672,279 A | 9/1997 | Sargent et al. |
| 5,708,107 A | 1/1998 | Ahmed et al. |
| 5,763,610 A | 6/1998 | Ahmed et al. |
| 5,789,610 A | 8/1998 | Bowen |
| 5,855,244 A | 1/1999 | Ahmed et al. |
| 5,883,210 A | 3/1999 | Ahmed et al. |
| 5,919,375 A | 7/1999 | Sargent et al. |
| 5,922,653 A | 7/1999 | Ahmed et al. |
| 5,990,051 A | 11/1999 | Ischy et al. |
| 6,051,670 A | 4/2000 | Ahmed et al. |
| 6,117,364 A | 9/2000 | Vorderbruggen et al. |
| 6,340,660 B1 | 1/2002 | Gastgaber |
| 6,365,121 B1 | 4/2002 | Wurmbauer |
| 6,425,947 B1 | 7/2002 | Berlin et al. |
| 6,436,880 B1 | 8/2002 | Frenier |
| 6,793,905 B1 | 9/2004 | Buttner et al. |
| 7,029,553 B1 | 4/2006 | Williams et al. |
| 7,357,879 B2 | 4/2008 | Takahashi et al. |
| 7,534,754 B2 | 5/2009 | Netherton |
| 7,547,665 B2 | 6/2009 | Welton et al. |
| 7,621,334 B2 | 11/2009 | Welton et al. |
| 7,658,805 B2 | 2/2010 | Netherton |
| 7,915,205 B2 | 3/2011 | Smith et al. |
| 7,938,912 B1 | 5/2011 | MacDonald |
| 8,003,577 B2 | 8/2011 | Li et al. |
| 8,092,555 B2 | 1/2012 | Hertz et al. |
| 8,101,664 B2 | 1/2012 | Silvander |
| 8,163,092 B2 | 4/2012 | Baniel et al. |
| 8,163,102 B1 | 4/2012 | MacDonald |
| 8,269,037 B2 | 9/2012 | Vorberg et al. |
| 8,430,971 B1 | 4/2013 | MacDonald |
| 8,940,106 B1 | 1/2015 | MacDonald |
| 2006/0142166 A1 | 6/2006 | Thomas |
| 2007/0235189 A1 | 10/2007 | Milne et al. |
| 2007/0289640 A1* | 12/2007 | Kirchner ............... G05D 7/014 137/503 |
| 2009/0247431 A1 | 10/2009 | Gupta et al. |
| 2010/0282236 A1 | 11/2010 | Xiao et al. |
| 2011/0124533 A1 | 5/2011 | Notte et al. |
| 2012/0138299 A1 | 6/2012 | Joseph et al. |
| 2012/0238479 A1 | 9/2012 | Choudhary et al. |
| 2013/0261032 A1 | 10/2013 | Ladva et al. |
| 2014/0041690 A1 | 2/2014 | Macdonald, II et al. |
| 2014/0116708 A1 | 5/2014 | Wadekar et al. |
| 2014/0374107 A1* | 12/2014 | Reyes ..................... C09K 8/72 166/307 |
| 2015/0114647 A1 | 4/2015 | Jiang et al. |
| 2015/0344771 A1 | 12/2015 | Jiang et al. |

FOREIGN PATENT DOCUMENTS

| | | |
|---|---|---|
| CN | 103387518 A | 11/2013 |
| EP | 0123066 | 10/1984 |
| EP | 1136529 | 9/2001 |
| EP | 1886976 A1 | 2/2008 |
| HU | 195241 | 4/1988 |
| HU | 195241 B | 6/1989 |
| RU | 2106488 C1 | 3/1998 |
| WO | 2009086954 A1 | 7/2009 |
| WO | 2012075091 A2 | 6/2012 |
| WO | WO2012075091 | 6/2012 |
| WO | WO2012076841 | 6/2012 |
| WO | 2013064823 A1 | 5/2013 |
| WO | 2013140402 A1 | 9/2013 |

OTHER PUBLICATIONS

Scherrer, "On the combination of Urea with the Hydracids", Jan. 14, 1843, The Chemical Gazette, vol. I, No. VI pp. 141-145.

Extended European Search Report issued in related EP application 14187120.2 on Nov. 12, 2015, 3 pages.

Das Gupta, et al., "Interaction of urea with weak acids and water", 1987, J. Phys. Chem., vol. 91, No. 22, pp. 5826-5832.

International Search Report and Written Opinion issued in related PCT application PCT/US2014/044239 on Oct. 16, 2014, 10 pages.

Notice of Acceptance issued in related AU Application No. 2014227472 mailed Feb. 10, 2016 (3 pages).

Examination Report issued in Australian Patent Application No. 2014227472 on Feb. 13, 2015; 3 pages.

Examination Report issued in Australian Patent Application No. 2014227472 on Sep. 10, 2015; 3 pages.

Partial European Search Report issued in European Patent Application No. 14187120.2 on Apr. 29, 2015; 6 pages.

Hayashi, K. et al., "Solubilities Studies of Basic Amino Acids", Agr. Biol. Chem., 1966, vol. 30, No. 4, pp. 378-384.

Office Action issued in Chinese Patent Application No. 201410558608.6 on Mar. 1, 2017; 18 pages (with English translation).

Non-Final Office Action issued in U.S. Appl. No. 14/824,362 dated Jun. 28, 2017; 17 pages.

* cited by examiner

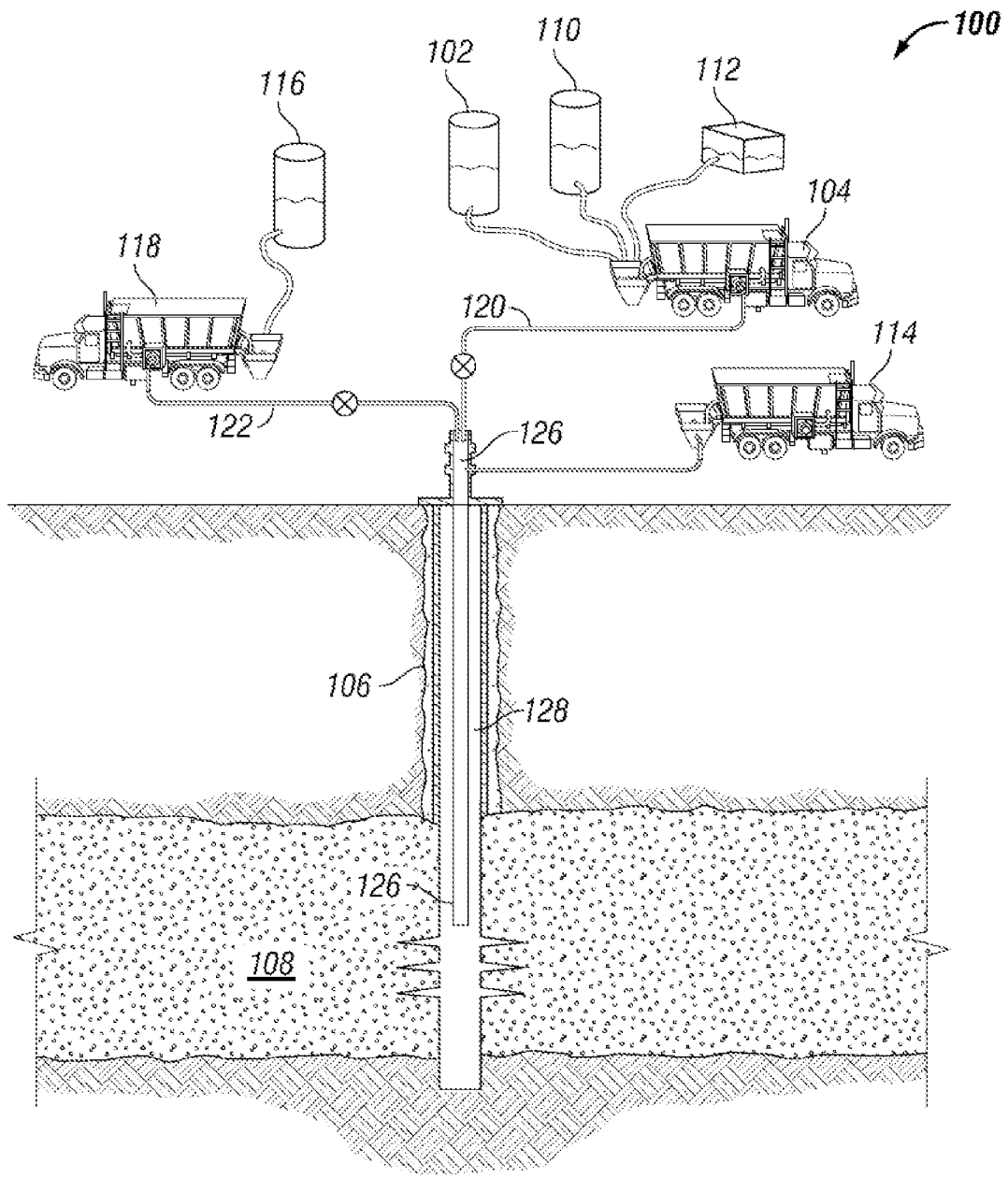

AQUEOUS SOLUTION AND METHOD FOR USE THEREOF

RELATED APPLICATION DATA

None.

BACKGROUND

The statements in this section merely provide background information related to the present disclosure and may not constitute prior art. The technical field generally, but not exclusively, relates to high concentration of hydrochloric acid (HCl) solutions with amino acids and uses thereof.

SUMMARY

In an aspect, embodiments relate to compositions comprising hydrochloric acid at a concentration between 8 wt % and 28 wt % inclusive and at least one amino acid. The amino acid/hydrochloric acid molar ratio is between 0.2 and 1.5, and sufficient water is present to dissolve the hydrochloric acid and the amino acid. The amino acid may comprise alanine, asparagines, aspartic acid, cysteine, glutamic acid, histidine, leucine, lysine, methonine, proline, serine, threonine or valine or combinations thereof.

In a further aspect, embodiments relate to methods for treating a formation in a subtereanean well. An aqueous composition is prepared that comprises hydrochloric acid at a concentration between 8 wt % and 28 wt % inclusive, and at least one amino acid. The amino acid/hydrochloric acid molar ratio is between 0.2 and 1.5, and sufficient water is present to dissolve the hydrochloric acid and the amino acid. An oilfield treatment fluid that contains the aqueous composition is provided to a high-pressure pump. The high-pressure pump is then operated to treat at least one of a wellbore and the formation fluidly coupled to the wellbore. The amino acid may comprise alanine, asparagines, aspartic acid, cysteine, glutamic acid, histidine, leucine, lysine, methonine, proline, serine, threonine or valine or combinations thereof.

In yet a further aspect, embodiments relate to methods for stimulating a subterranean well having a wellbore. An aqueous composition is prepared that comprises hydrochloric acid at a concentration between 8 wt % and 28 wt % inclusive, and at least one amino acid. The amino acid/hydrochloric acid molar ratio is between 0.2 and 1.5, and sufficient water is present to dissolve the hydrochloric acid and the amino acid. An oilfield treatment fluid that contains the aqueous composition is provided to a high-pressure pump. The high-pressure pump is then operated to stimulate at least one of a wellbore and the formation fluidly coupled to the wellbore, thereby increasing formation permeability. The amino acid may comprise alanine, asparagines, aspartic acid, cysteine, glutamic acid, histidine, leucine, lysine, methonine, proline, serine, threonine or valine or combinations thereof.

In yet a further aspect, embodiments relate to methods for handling a composition. An aqueous solution is provided that has a hydrochloric acid concentration exceeding 37 wt %. An amino acid fixing agent is added to the solution, wherein the amount of fixing agent includes a molar ratio of fixing agent:hydrochloric acid between 0.2 and 1.5. The solution is placed into an atmospherically pressured vessel, and the vessel is transported to a service location over a public road, a railway or both.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description.

BRIEF DESCRIPTION OF THE DRAWINGS

FIG. 1 depicts example equipment to treat a wellbore and/or a formation fluidly coupled to the wellbore.

DETAILED DESCRIPTION OF SOME ILLUSTRATIVE EMBODIMENTS

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the compositions used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that the Applicant appreciates and understands that any and all data points within the range are to be considered to have been specified, and that the Applicant possessed knowledge of the entire range and all points within the range.

The term formation as utilized herein should be understood broadly. A formation includes any underground fluidly porous formation, and can include without limitation any oil, gas, condensate, mixed hydrocarbons, paraffin, kerogen, water, and/or $CO_2$ accepting or providing formations. A formation can be fluidly coupled to a wellbore, which may be an injector well, a producer well, and/or a fluid storage well. The wellbore may penetrate the formation vertically, horizontally, in a deviated orientation, or combinations of these. The formation may include any geology, including at least a sandstone, limestone, dolomite, shale, tar sand, and/or unconsolidated formation. The wellbore may be an individual wellbore and/or a part of a set of wellbores directionally deviated from a number of close proximity surface wellbores (e.g. off a pad or rig) or single initiating wellbore that divides into multiple wellbores below the surface.

The term "oilfield treatment fluid" as utilized herein should be understood broadly. In certain embodiments, an oilfield treatment fluid includes any fluid having utility in an oilfield type application, including a gas, oil, geothermal, or injector well. In certain embodiments, an oilfield treatment fluid includes any fluid having utility in any formation or wellbore described herein. In certain embodiments, an oilfield treatment fluid includes a matrix acidizing fluid, a wellbore cleanup fluid, a pickling fluid, a near wellbore damage cleanup fluid, a surfactant treatment fluid, an unviscosified fracture fluid (e.g. slick water fracture fluid), and/or any other fluid consistent with the fluids otherwise described herein. An oilfield treatment fluid may include any type of additive known in the art, which are not listed herein for purposes of clarity of the present description, but which may include at least friction reducers, inhibitors, surfactants and/or wetting agents, fluid diverting agents, particulates, acid retarders (except where otherwise provided herein), organic acids, chelating agents, energizing agents (e.g. $CO_2$ or $N_2$), gas generating agents, solvents, emulsifying agents, flowback control agents, resins, breakers, and/or non-polysaccharide based viscosifying agents.

The term "high pressure pump" as utilized herein should be understood broadly. In certain embodiments, a high pressure pump includes a positive displacement pump that provides an oilfield relevant pumping rate—for example at least 80 L/min (0.5 bbl/min or bpm), although the specific example is not limiting. A high pressure pump includes a pump capable of pumping fluids at an oilfield relevant pressure, including at least 3.5 MPa (500 psi), at least 6.9 MPa (1,000 psi), at least 13.8 MPa (2,000 psi), at least 34.5 MPa (5,000 psi), at least 68.9 MPa (10,000 psi), up to 103.4 MPa (15,000 psi), and/or at even greater pressures. Pumps suitable for oilfield cementing, matrix acidizing, and/or hydraulic fracturing treatments are available as high pressure pumps, although other pumps may be utilized.

The term "treatment concentration" as utilized herein should be understood broadly. A treatment concentration in the context of an HCl concentration is a final concentration of the fluid before the fluid is positioned in the wellbore and/or the formation for the treatment. The treatment concentration may be the mix concentration available from the HCl containing fluid at the wellsite or other location where the fluid is provided from. The treatment concentration may be modified by dilution before the treating and/or during the treating. Additionally, the treatment concentration may be modified by the provision of additives to the fluid. Example and non-limiting treatment concentrations include 7.5%, 15%, 20%, 28%, 36%, and/or up to 45.7% HCl concentration in the fluid. In certain embodiments, a treatment concentration is determined upstream of additives deliver (e.g. at a blender, hopper, or mixing tub) and the concentration change from the addition of the additives is ignored. In certain embodiments, the treatment concentration is a liquid phase or acid phase concentration of a portion of the final fluid—for example when the fluid is an energized or emulsified fluid. In certain embodiments the treatment concentration exceeds 15%. In certain embodiments, the fluid concentration exceeds 36% or exceeds 37%.

Applicant has determined that an amino acid fixing agent (FA) has utility in retarding the rate at which hydrochloric acid solutions react with carbonate-mineral surfaces. Such retardation is useful in the context of stimulating or improving production from subterranean formations that contain hydrocarbons, steam, geothermal brines and other valuable materials as known in the art. Slowing the rate of reaction may allow deeper penetration of the acid into the subterranean formations, thereby increasing the formation permeability and productivity.

In an aspect, embodiments relate to compositions comprising hydrochloric acid at a concentration between 8 wt % and 28 wt % inclusive and at least one amino acid. The amino acid/hydrochloric acid molar ratio may be between 0.2 and 1.5, or 0.5 and 1.5 or 0.2 and 1.1, and sufficient water is present to dissolve the hydrochloric acid and the amino acid. The amino acid may comprise alanine, asparagines, aspartic acid, cysteine, glutamic acid, histidine, leucine, lysine, methonine, proline, serine, threonine or valine or combinations thereof.

In a further aspect, embodiments relate to methods for treating a formation in a subterreanean well. An aqueous composition is prepared that comprises hydrochloric acid at a concentration between 8 wt % and 28 wt % inclusive, and at least one amino acid. The amino acid/hydrochloric acid molar ratio may be between 0.2 and 1.5, or 0.5 and 1.5 or 0.2 and 1.1, and sufficient water is present to dissolve the hydrochloric acid and the amino acid. An oilfield treatment fluid that contains the aqueous composition is provided to a high-pressure pump. The high-pressure pump is then operated to treat at least one of a wellbore and the formation fluidly coupled to the wellbore. The amino acid may comprise alanine, asparagines, aspartic acid, cysteine, glutamic acid, histidine, leucine, lysine, methonine, proline, serine, threonine or valine or combinations thereof.

In yet a further aspect, embodiments relate to methods for stimulating a subterranean well having a wellbore. An aqueous composition is prepared that comprises hydrochloric acid at a concentration between 8 wt % and 28 wt % inclusive, and at least one amino acid. The amino acid/hydrochloric acid molar ratio may be between 0.2 and 1.5, or 0.5 and 1.5 or 0.2 and 1.1, and sufficient water is present to dissolve the hydrochloric acid and the amino acid. An oilfield treatment fluid that contains the aqueous composition is provided to a high-pressure pump. The high-pressure pump is then operated to stimulate at least one of a wellbore and the formation fluidly coupled to the wellbore, thereby increasing formation permeability. The amino acid may comprise alanine, asparagines, aspartic acid, cysteine, glutamic acid, histidine, leucine, lysine, methonine, proline, serine, threonine or valine or combinations thereof.

For all aspects, the selection of a molar ratio of amino acid:HCl depends upon the specific embodiment, and is a mechanical step for one of skill in the art having the benefit of the disclosures herein. It will be understood that an upper limit of amino acid is present as the solubility of the amino acid and HCl in the aqueous solution is reached, and that higher molecular weight FA materials will provide lower molar ratios of amino acid:HCl at the highest HCl concentrations. In certain embodiments, the amino acid is selected having a molecular weight below 100 g/mol. Additionally or alternatively, the FA may have a molecular weight below 150 g/mol, below 175 g/mol, or greater than these values.

For all aspects, the composition may further comprise hydrofluoric acid (HF). HF exhibits distinct reactions from HCl, and is useful in certain applications to enhance the activity of the resulting aqueous solution. For example, HF is utilized in the cleanup of sandstone formations where HCl alone is not effective for removing certain types of formation damage. It is believed that the present aqueous solution will complex with HF similarly to the observed effects with HCl. Accordingly, solutions can be formulated with a total acid amount that is much higher than presently attainable formulations. In certain embodiments, the HF is present in an amount of at least 0.25% by weight. The HF may be present in an amount of up to 2%, up to 6%, up to 10%, up to 15%, or greater amounts. The HF may be present in addition to the amount of HCl, and/or as a substitution for an amount of the HCl.

For all aspects, the composition may exhibit an acid retardation factor higher than or equal to 15 at 20° C. At 93° C., the composition may exhibit an acid retardation factor higher than or equal to 15. The retardation factor indicates the ratio between the time required for retarded HCl to consume a given amount of limestone, compared to the time required for an HCl solution at an equal concentration to consume the same amount of limestone. Without wishing to be held to any theory, Applicant believes the retardation effect exhibited by amino acids results from the formation of an adduct between the nitrogen atoms in the amino acid and the acidic proton in the strong acid (e.g., HCl or HF).

Referencing FIG. 1, a system 100 is depicted having example equipment to treat a wellbore 106 and/or a formation 108 fluidly coupled to the wellbore 106. The formation 108 may be any type of formation. The wellbore 106 is depicted as a vertical, cased and cemented wellbore 106, having perforations providing fluid communication between the formation 108 and the interior of the wellbore 106. However, none of the particular features of the wellbore 106 are limiting, and the example is provided only to provide an example context 100 for a procedure.

The system 100 includes a high-pressure pump 104 having a source of an aqueous solution 102. In a first example, the aqueous solution 102 includes an amino acid fixing agent FA and HCl, the HCl in an amount between 8% and 28% inclusive, and the FA present in a molar ratio between 0.2 and 1.5 inclusive. The aqueous solution 102 further includes water in an amount sufficient to dissolve the HCl and the FA. The high pressure pump 104 is fluidly coupled to the wellbore 106, through high pressure lines 120 in the example. The example system 100 includes a tubing 126 in the wellbore 106. The tubing 126 is optional and non-limiting. In certain examples, the tubing 106 may be omitted, a coiled tubing unit (not shown) may be present, and/or the high pressure pump 104 may be fluidly coupled to the casing or annulus 128.

Certain additives (not shown) may be added to the aqueous solution 102 to provide an oilfield treatment fluid. Additives may be added at a blender (not shown), at a mixing tub of the high pressure pump 104, and/or by any other method. In certain embodiments, a second fluid 110 may be a diluting fluid, and the aqueous solution 102 combined with some amount of the second fluid 110 may make up the oilfield treatment fluid. The diluting fluid may contain no HCl, and/or HCl at a lower concentration than the aqueous solution 102. The second fluid 110 may additionally or alternatively include any other materials to be added to the oilfield treatment fluid, including additional amounts of an FA. In certain embodiments, an additional FA solution 112 is present and may be added to the aqueous solution 102 during a portion or all of the times when the aqueous solution 102 is being utilized. The additional FA solution 112 may include the same or a different FA from the aqueous solution 102, may include all of the FA for the oilfield treatment fluid, and/or may include FA at a distinct concentration from the aqueous solution.

The high-pressure pump 104 can treat the wellbore 106 and/or the formation 108, for example by positioning fluid therein, by injecting the fluid into the wellbore 106, and/or by injecting the fluid into the formation 108. Example and non-limiting operations include any oilfield treatment without limitation. Potential fluid flows include flowing from the high-pressure pump 104 into the tubing 126, into the formation 108, and/or into the annulus 128. The fluid may be recirculated out of the well before entering the formation 108, for example utilizing a back side pump 114. In the example, the annulus 128 is shown in fluid communication with the tubing 126, although in certain embodiments the annulus 128 and the tubing 126 may be isolated (e.g. with a packer). Another example of fluid flow includes flowing the oilfield treatment fluid into the formation at a matrix rate (e.g. a rate at which the formation is able to accept fluid flow through normal porous flow), and/or at a rate that produces a pressure exceeding a hydraulic fracturing pressure. The fluid flow into the formation may be either flowed back out of the formation, and/or flushed away from the near wellbore area with a follow up fluid. Fluid flowed to the formation may be flowed to a pit or containment (not shown), back into a fluid tank, prepared for treatment, and/or managed in any other manner known in the art. Acid remaining in the returning fluid may be recovered or neutralized.

In another example, fluid flow includes the aqueous solution 102 including HCl, with FA being optional and in certain embodiments not present in the aqueous solution 102. The example fluid flow includes a second aqueous solution 116 including FA. The fluid flow includes, sequentially, a first high-pressure pump 104 and a second high-pressure pump 118 treating the formation 108. The second high-pressure pump 118 in the example is fluidly coupled to the tubing 126 through a second high pressure line 122. The fluid delivery arrangement is optional and non-limiting. In certain embodiments, a single pump may deliver both the aqueous solution 102 and the second aqueous solution 116. In the example, either the first aqueous solution 102 or the second aqueous solution 116 may be delivered first, and one or more of the solutions 102, 116 may be delivered in multiple stages, including potentially some stages where the solutions 102, 116 are mixed.

The schematic flow descriptions which follow provide illustrative embodiments of performing procedures for treating formations and/or wellbores. Operations illustrated are understood to be examples only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

In yet a further aspect, embodiments relate to methods for handling a composition.

An example procedure includes combining an amount of water with a fixing agent (FA), where the amount of water is present in an amount between 0.3 and 1.3 times the mass of the FA. The procedure further includes dissolving an amount of HCl into the combined amount of water and FA. The dissolution of the HCl gas may occur after dissolving of the FA, simultaneous with the dissolving of the FA, or at least partially before the dissolving of the FA. The amount of HCl gas is in a molar ratio of between 4.0 and 0.5 times the amount of the FA. The total amount of HCl gas dissolved into the aqueous solution is greater than 37% by weight.

In a further example, the procedure includes dissolution of at least a portion of the FA in the water during the dissolution of the HCl gas in the combined water and FA. Example operations include beginning the dissolution of the HCl and adding the FA as a solid or a solution, providing some of the FA in solution with the water and some of the FA as a solid, and/or providing the FA as a solid in the water and dissolving the HCl into the water while dissolving the FA.

Another example procedure includes providing an aqueous solution having an amount of HCl exceeding 37% by weight. The procedure further includes an operation to suppress gaseous HCl fumes from the aqueous solution. The operation to suppress the gaseous HCl fumes includes an operation to add an HCl fixing agent (FA) to the solution, where the amount of FA includes a molar ratio of FA:HCl of between 0.2 and 1.5 inclusive. The FA includes one or more amino acids. The operation to add the fixing agent may be performed before, simultaneously, and/or partially after the addition of the HCl into the solution.

An example procedure further includes an operation to transport the HCl solution over a public road and/or a railway. In certain embodiments, the operation to transport the HCl solution includes placing the HCl solution into an atmospherically pressured vessel, and/or a standard fluid vessel which does not provide for a pressurized environment. Another example procedure includes transporting the HCl solution having over 37% HCl by weight to a location, and diluting the HCl solution to a desired HCl concentration after the transporting. Example dilution concentrations include, without limitation, diluting the solution to 7.5% HCl, to 15% HCl, and/or to 28% HCl by weight. Any other concentrations are also contemplated herein. The transport and dilution allows for reduced transport costs and risk (e.g. fewer transport vessels) while providing the desired total amount of HCl at the usage location.

An example procedure further includes residing the HCl solution in an atmospheric pressure vessel for a time period, which may be a period of at least an hour. The operation to reside the HCl solution in an atmospheric pressure vessel includes residing the solution without adding an additional acid retarder to the HCl solution. Any acid retarder is contemplated herein, and the exclusion of other acid retarders in certain embodiments is optional.

Another example procedure includes positioning an operator into a vapor space communication with the HCl solution, and performing a fluid utility operation after the positioning. Example and non-limiting fluid utility operations that may put an operator into a vapor space communication with the HCl solution include checking a fluid level of the HCl solution (e.g. a visual depth check, and/or a fluid depth check with a device); performing a fluid test on the HCl solution (e.g. fluid property test, pH reading, taking a fluid sample for testing); adding an amount of an additive to the aqueous solution (e.g. adding the additive through an opening into a fluid tank or chemical tote); closing a lid on an atmospheric pressure vessel holding the HCl solution; transferring at least a portion of the HCl solution out of an atmospheric pressure vessel holding the HCl solution (e.g. transferring between tanks or totes, moving at a bulk facility, transferring into a treatment fluid); performing a visual check on the HCl solution; operationally coupling a fluid transfer device to one of the HCl solution and/or an atmospheric pressure vessel holding the HCl solution (e.g. connecting a fluid transfer line, inserting a transfer line into the top of a vessel); and/or agitating the HCl solution (e.g. with a stirrer, gaseous agitation, and/or recirculating the fluid).

Without limitation, it is contemplated the procedure includes any one of a number of specific embodiments. An example includes treating with the first oilfield treatment fluid and then the second oilfield treatment fluid, or treating with the second oilfield treatment fluid then the first oilfield treatment fluid. An example includes the first oilfield treatment fluid including no FA, including FA in an amount distinct from the amount of FA1 in the second oilfield treatment fluid, and/or including FA1 in an amount that is the same or similar to the amount of FA1 in the second oilfield treatment fluid. An example includes the second oilfield treatment fluid including no HCl, including HCl in an amount distinct from the amount of HCl in the first oilfield treatment fluid, and/or including FA1 in an amount that is the same or similar to the amount of FA1 in the first oilfield treatment fluid. The first and second oilfield treatment fluids do not include both the HCl amount and the FA1 amount present in identical amounts with each other, although either one of the HCl amount or the FA1 amount may be present in identical amounts with each other. Additionally, it is contemplated that multiple stages of the first oilfield treatment fluid and/or the second oilfield treatment fluid may be performed, which stages may be equal or unequal in size or number, and/or which may include spacer fluids or not between any one or more of the stages.

As is evident from the figures and text presented above, a variety of embodiments according to the present disclosure are contemplated.

The present disclosure may be further illustrated by the following examples. These examples do not limit the scope of the disclosure.

EXAMPLES

Example 1

In the following experiments, test solutions were prepared by dissolving an amino acid into 37% HCl. The 37% HCl concentration was obtained by bubbling HCl gas into the test vessel. For example, 15.8 g of L-Asparagine were dissolved into 10 mL of 37% HCl by stirring, resulting in a 1:1 molar ratio mixture of the two species.

During the retardation tests, 0.2 mL of test solution was applied to a 25-g core of Indiana limestone at either 20° C. or 93° C. The reaction was allowed to proceed until the acid was completely spent.

Table 1 presents results of acid retardation tests performed with various amino acids (FA) and various amino acid:HCl molar ratios. The Asparagine adduct demonstrated significantly retarded but measurable reaction rates. By comparison, those of Glutamine, Histidine and Glycine exhibited moderate to lower levels of retardation. However, it was remarkable that the adducts of Serine methyl ester, Lysine and Arginine prevented limestone dissolution (at least within the test period) at 20° C. Hence, the retardation factor was too high to measure (THTM). At 93° C., evolution of gas bubbles from the limestone surface was observed but, again, the retardation factor was too high to measure (THTM*) within the test period.

TABLE 1

Observed acid retardation factors with certain amino acid fixing agents.

| Amino Acid (FA) | Mol. Wt. | Structure | FA:HCl (molar ratio) | Effective HCl % | Retardation factor (20° C.) | Retardation factor (93° C.) |
|---|---|---|---|---|---|---|
| L-Asperagine | 132 | | 1.1 | 15 | 90 | 70 |
| | | | 0.6 | 21 | 75 | 40 |
| | | | 0.2 | 28 | 40 | 18 |
| L-Glutamine | 146 | | 0.5 | 21 | 33 | 24 |
| L-Histidine | 155 | | 0.2 | 28 | 18 | 15 |
| Glycine | 76 | | 1 | 15 | 25 | 20 |
| | | | 1 | 21 | 21 | 16 |
| D-Serine methyl ester | 120 | | 1 | 15 | THTM | THTM* |
| L-Lysine | 147 | | 1 | 8.3 | THTM | THTM* |
| L-Arginine | 175 | | 1 | 9.4 | THTM | THTM* |

THTM = too high to measure; THTM*-reaction detected by gas bubble formation, but retardation factor too high to measure.

As is evident from the figures and text presented above, a variety of embodiments according to the present disclosure are contemplated.

While the disclosure has provided specific and detailed descriptions to various embodiments, the same is to be considered as illustrative and not restrictive in character. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

Moreover, in reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. It is the express intention of the applicant not to invoke 35 U.S.C. §112, paragraph 6 for any limitations of any of the claims herein, except for those in which the claim expressly uses the words 'means for' together with an associated function.

We claim:

1. A method for treating a formation in a subterranean well, comprising:
   (i) preparing an aqueous composition comprising hydrochloric acid at a concentration between 8 wt % and 28 wt %, inclusive; and at least one amino acid, wherein the amino acid:hydrochloric acid molar ratio is between 0.2 and 1.5, and sufficient water is present to dissolve the hydrochloric acid and the amino acid;
   (ii) providing an oilfield treatment fluid including the aqueous composition to a high pressure pump capable of pumping fluids at a pressure of at least 500 psi; and
   (iii) operating the high pressure pump to treat at least one of a wellbore and the formation fluidly coupled to the wellbore,
   wherein the amino acid comprises alanine, asparagine, aspartic acid, cysteine, glutamic acid, histidine, leucine, lysine, methonine, proline, serine, threonine or valine or combinations thereof.

2. The method of claim 1, wherein the hydrochloric acid is transported to a wellsite, the acid having a concentration between 28 wt % and 45.7 wt %, and the treatment further comprises diluting the hydrochloric acid to a treatment concentration before providing the oilfield treatment fluid to the high pressure pump.

3. The method of claim 1, wherein the aqueous composition further comprises hydrofluoric acid at a concentration higher than or equal to 0.25 wt %.

4. The method of claim 1, wherein the composition exhibits an acid retardation factor higher than or equal to 15 at 20° C.

5. The method of claim 1, wherein the composition exhibits an acid retardation factor higher than or equal to 15 at 93° C.

6. The method of claim 1, wherein operating the pump comprises injecting the treatment fluid into the formation at matrix rates, and contacting at least one of the wellbore and the formation with the oilfield treatment fluid.

7. The method of claim 1, wherein operating the pump comprises injecting the treatment fluid into the formation at a pressure equal to or greater than the formation fracturing pressure, and contacting at least one of the wellbore and the formation with the oilfield treatment fluid.

8. A method for stimulating a formation in a subterranean well, comprising:
   (i) preparing an aqueous composition comprising hydrochloric acid at a concentration between 8 wt % and 28 wt %, inclusive; and at least one amino acid, wherein the amino acid:hydrochloric acid molar ratio is between 0.2 and 1.5, and sufficient water is present to dissolve the hydrochloric acid and the amino acid;
   (ii) providing an oilfield treatment fluid including the aqueous composition to a high pressure pump capable of pumping fluids at a pressure of at least 500 psi; and
   (iii) operating the high pressure pump to stimulate at least one of a wellbore and the formation fluidly coupled to the wellbore, thereby increasing formation permeability, wherein the amino acid comprises alanine, asparagine, aspartic acid, cysteine, glutamic acid, histidine, leucine, lysine, methonine, proline, serine, threonine, valine or combinations thereof.

9. The method of claim 8, wherein the hydrochloric acid is transported to a wellsite, the acid having a concentration between 28 wt % and 45.7 wt %, and the treatment further comprises diluting the hydrochloric acid to a treatment concentration before providing the oilfield treatment fluid to the high pressure pump.

10. The method of claim 8, wherein the aqueous composition further comprises hydrofluoric acid at a concentration higher than or equal to 0.25 wt %.

11. The method of claim 8, wherein the composition exhibits an acid retardation factor higher than or equal to 15 at 20° C.

12. The method of claim 8, wherein the composition exhibits an acid retardation factor higher than or equal to 15 at 93° C.

13. The method of claim 8, wherein operating the pump comprises at least one of:
   (i) injecting the treatment fluid into the formation at matrix rates;
   (ii) injecting the treatment fluid into the formation at a pressure equal to or greater than the formation fracturing pressure; and
   (iii) contacting at least one of the wellbore and the formation with the oilfield treatment fluid.

* * * * *